May 28, 1929.  J. A. HIGGINS  1,715,236
JACKING APPARATUS FOR TRAILERS
Filed Dec. 8, 1927    2 Sheets-Sheet 2
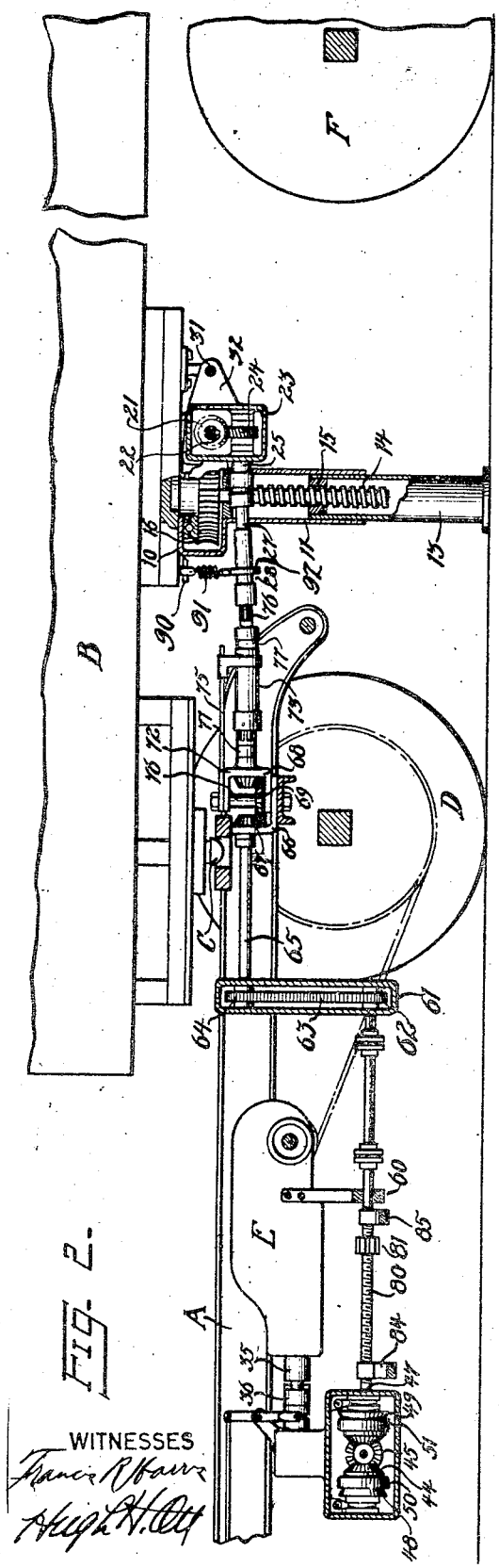
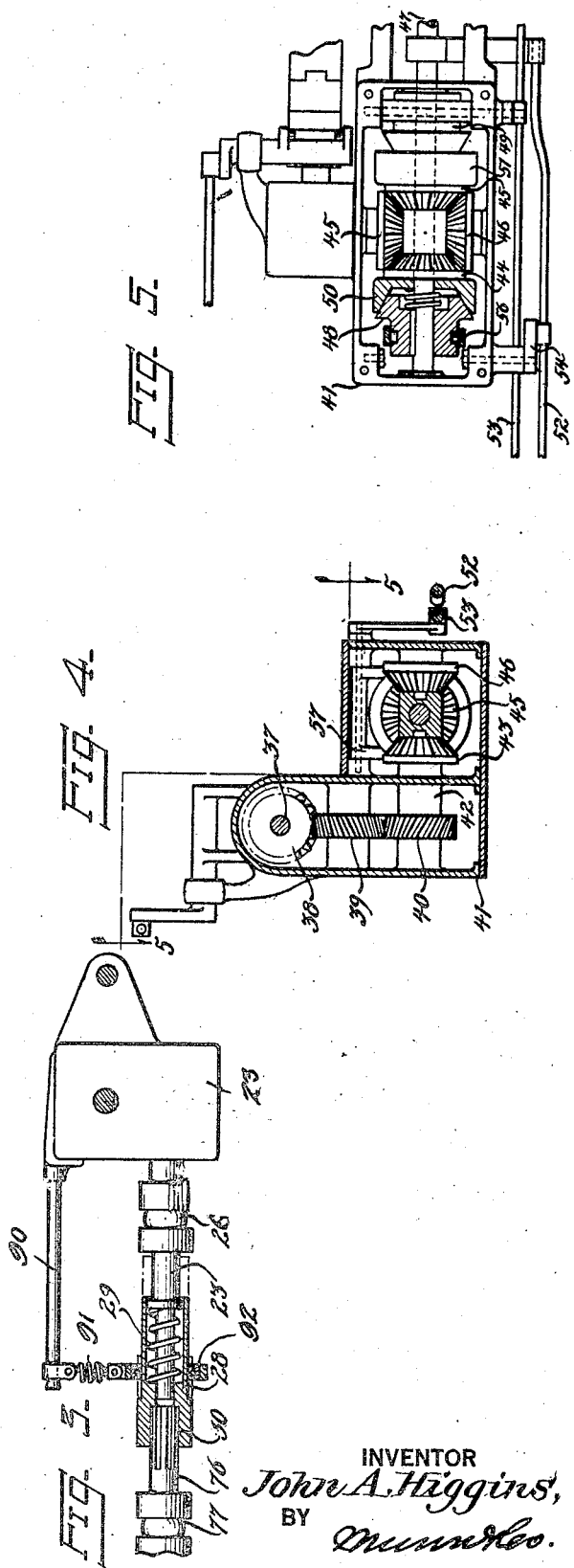
INVENTOR
John A. Higgins,
BY
ATTORNEY Patented May 28, 1929.

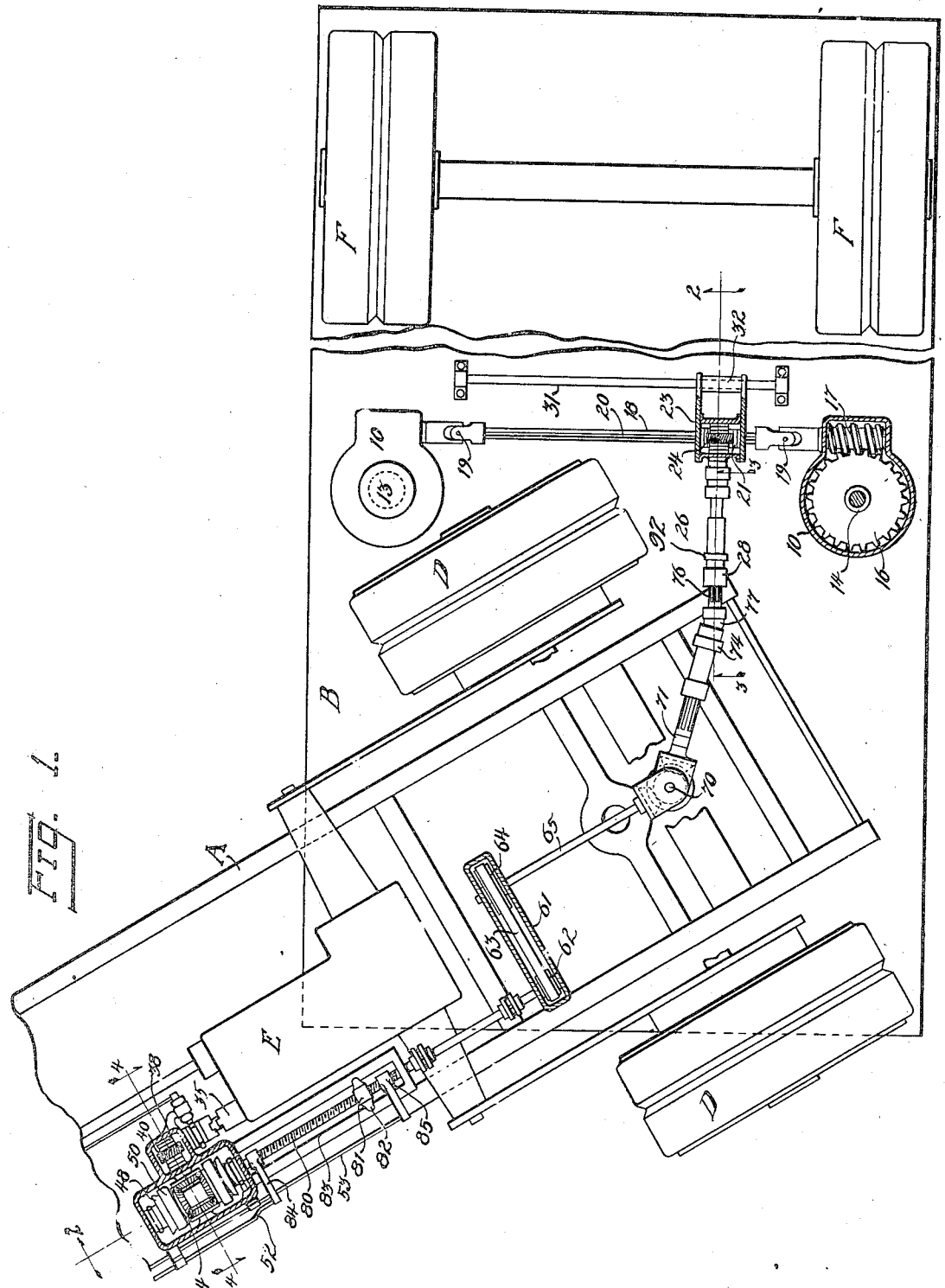

1,715,236

UNITED STATES PATENT OFFICE.

JOHN A. HIGGINS, OF BROOKLYN, NEW YORK.

JACKING APPARATUS FOR TRAILERS.

Application filed December 8, 1927. Serial No. 238,623.

This invention relates to a jacking apparatus for trailer trucks of the type which are drawn by motor tractors and comprehends an improved mechanism for elevating the trailer to disconnect the coupling therebetween and to support said trailer in said elevated position while the same is being loaded or unloaded, whereby the motor tractor may be employed to haul other trailers.

While acknowledging the existence of jacking devices which constitute a permanent part of a trailer, the present invention comprehends a jacking apparatus which while including this feature, furthermore contemplates equipment or mechanism as part of the motor tractor, which is adapted to be operatively connected or coupled with the trailer jacking apparatus for actuating the same by the tractor motive power plant.

The invention furthermore embodies a coupling or detachable means of connection between the trailer jacking apparatus and the tractor driving mechanism which permits of coupling or connecting without regard to the exact alinement of the tractor and trailer.

As a further feature, the invention comprehends means for automatically limiting the actuation of the jacking apparatus by the driving mechanism therefor, so as to eliminate the necessity of the operator having to observe the jacking operation, and, further, to afford a safety factor in the use and operation of the device.

Other objects reside in the comparative simplicity of construction and mode of operation of the device, the economy with which the same may be produced and installed on tractors and trailers now in general use, as well as those initially manufactured and the general efficiency derived therefrom.

With the above recited and other objects in view, reference is had to the following description and accompanying drawings in which there is exhibited one example or embodiment of the invention, while the appended claims define the actual scope of the invention.

In the drawings—

Figure 1 is a bottom plan view with parts broken away and shown in section and illustrating the motor-driven jack-operating means carried by the tractor operatively connected or coupled with the trailer jacking apparatus;

Fig. 2 is a longitudinal sectional view therethrough taken approximately on the line 2—2 of Fig. 1;

Fig. 3 is an enlarged detail sectional view of the detachable coupling or connection between the jacking apparatus and the driving mechanism therefor;

Fig. 4 is a transverse sectional view taken approximately on the line 4—4 of Fig. 1;

Fig. 5 is a sectional plan view taken approximately on the line 5—5 of Fig. 4.

Referring to the drawings by characters of reference, A designates a motor tractor, and B a trailer truck, of the types which are now in general use, the same being connected by a coupling C. The tractor is provided with the usual front steering wheels (not shown) and the rear driving wheels D which are driven from the usual transmission E. The trailer is provided near its rear end with supporting wheels F, the forward end being directly supported at the coupling point C upon the rear of the tractor A.

The trailer in the present instance includes a jacking apparatus forming a permanent part thereof and secured to the under forward portion of the trailer immediately in rear of the coupling point C to constitute a means for elevating the forward portion of the trailer to disconnect the same from the tractor and to support the same when the tractor is removed.

The jacking apparatus preferably consists of a pair of laterally spaced jacks, each of which comprises stationary jack casing sections 10 having a depending tubular sleeve 11 within which a leg 13 is telescopically movable by virtue of a jack screw 14 which is mounted in the casing and jack sleeve 11 for turning movement with respect thereto, and which jack screw threadedly engages the threaded portion 15 of the leg 13. The jack screws 14 each have connected thereto a worm wheel 16 which is driven by a worm gear 17. The jacks are connected to each other for simultaneous turning movement by a transverse shaft 18 which is operatively connected with the worm gears 17 by suitable universal joints 19. The shaft 18 is provided with a keyway 20 and upon said shaft a worm gear 21 is splined by a spline key 22 engaging the keyway. The worm gear 21 is mounted within a housing 23 and meshes with a worm wheel 24 also mounted within the housing. The shaft 25 of the worm wheel 24 projects forwardly through the housing 23 and is connected by a universal joint 26 to a trunnion 27 carrying at its forward free end a female coupling head 28. The coupling head is normally projected forwardly by a spring 29 and is provided with a socket 30 at its forward end formed with axially extending circumferentially spaced teeth or serrations. The housing 23 is longitudinally or axially movable with respect to the shaft 18 and transversely movable with respect to the under side of the trailer body upon the shaft 18 and also upon a guide rod 31 which is secured to the under side of the trailer body and engageable by a bearing bracket 32 formed on the housing 23.

The tractor transmission has secured to the countershaft or take-off shaft which projects through the transmission housing, a clutch element 35 which is adapted to be engaged by a sliding clutch element 36 on a shaft 37 for transmitting power through the medium of a worm wheel 38 secured to the shaft 37, to intermeshing worm gears 39 and 40. The worm wheel 38 and worm gears 39 and 40 are mounted in a casing or housing 41 which is suitably supported from the truck chassis. The shaft 42 of the worm gear 40 has secured thereto a bevel pinion 43, which meshes respectively with bevel gears 44 and 45 for driving or turning the same in opposite directions. If desired, an idler bevel pinion 46 may intermesh with the gears 44 and 45. A shaft 47 extends through the housing or casing 41 and axially through the gears 44 and 45 and said shaft has splined thereto sliding friction clutches 48 and 49 which are normally disengaged from complementary friction clutch elements 50 and 51 secured respectively to the bevel gears 44 and 45 for turning movement therewith. The movable clutch elements 48 and 49 are manually shiftable selectively into clutching engagement with the clutch elements 50 and 51, by shift rods 52 and 53 operatively connected by cranks 54 and 55 to shifting forks 56 and 57. The shaft 47 extends rearwardly through an intermediate bearing 60 into a housing 61 where it has secured thereto a sprocket 62 which is connected by a sprocket chain 63 to a second sprocket wheel 64 on a shaft section 65 which leads rearwardly and has bearing in a stationary bracket 66. A bevel gear 67 is attached to the rear end of the shaft 65 and a laterally swingable bracket 68 is carried by the stationary bracket 66. A bevel pinion 69 is mounted on and secured to a vertical shaft 70 which is respectively mounted in the stationary and turnable brackets 66 and 68. The turnable bracket has journaled therein a shaft 71 which has secured to its forward end a bevel gear 72 meshing with the bevel pinion 69. The shaft 71 has a splined connection with a shaft section 73 which is swiveled in a bearing element 74 slidably carried on a supporting arm 75 which is secured to and swingable with the swingable bearing bracket 68. The male coupling element 76 is connected to the rear free end of the shaft section 73 by a universal joint 77.

From the foregoing it will thus be seen that irrespective of the angular position in which the tractor is backed under the trailer, the male and female coupling elements 76 and 28 may be properly engaged by either swinging the shafts 71 and 73 of the male coupling element laterally or moving the housing 23 transversely of the trailer. When coupled the jack leg 13 may be raised by manipulation of the shift rod 52 to engage the slidable clutch element 49 with the stationary clutch element 51. This turns the shaft 47 in the same direction as the bevel gear 45 is being driven. When the trailer has been lowered so that the coupling C is properly engaged and the leg has been elevated to the desired position above the surface or ground line, the truck operator will properly manipulate means for disengaging the clutch elements 35 and 36. When the tractor and trailer reach the desired destination, and it is desired to release and leave the trailer in a standing position supported by the jack, the operator reengages the clutch elements 35 and 36 and engages the clutch elements 48 and 50. This couples the shaft 47 with the motive power to turn the same in the same direction as the bevel gear 44, which motion is transmitted to the jack screws 14 for lowering the jack legs 13 into contact with the ground, pavement or roadbed, and, subsequently, to elevate the forward portion of the trailer until the coupling C is disengaged. At this point, the tractor may be driven away, the coupling elements 76 and 28 being automatically disengaged.

In order to obviate the necessity of the operator having to observe the desired point at which either the clutch elements 35 and 36 must be disengaged, or the clutch elements 48 and 50, or 49 and 51, automatic means for disengaging the clutch elements 48 and 50, or 49 and 51, is provided as follows:

The shaft 47 is provided with a threaded portion 80 upon which an internal threaded nut or traveler 81 is mounted, the nut or traveler being held against rotation by ears 82 engaging a frame 83. Adjacent the opposite ends of the threaded portion 80, abutment elements 84 and 85 are provided, which are respectively connected with the rear ends of the shift rods 52 and 53. It thus follows that the accurately engaged clutch elements 48 and 50, or 49 and 51, as the case may be, causes, by the turning movement of the threaded portion of the shaft 80, the advancement of the nut or traveler element 81 toward the abutment arm 84 or 85, the same being so timed that when the jack legs 13 are fully retracted or projected the nut or traveler element will engage either of the abutment arms to disengage the engaged clutch elements 48 and 50 or 49 and 51.

If desired, the female coupling head 28 may be yieldably supported from the housing 23 by a bracket arm 90 attached to the housing and extending forwardly, which bracket arm has suspended by means of a coil spring 91, a swivel ring 92 which embraces the coupling head 28. This construction prevents sagging of the coupling head due to the universal joint connection 26 between the supporting trunnion 27 of the same and the shaft 25 of the worm wheel 24.

What is claimed is:

1. The combination with a trailer truck having jacking means permanently carried thereby for elevating and supporting the same, of a motor tractor for hauling the trailer including mechanism adapted to be coupled with the jacking means for actuating the same from the motive power of the tractor, said mechanism including means for uncoupling the mechanism from the motive power of the tractor when the jacking means has been moved approximately to the limit of its movement.

2. The combination with a trailer truck having jacking means permanently carried thereby for elevating and supporting the same, of a motor tractor for hauling the trailer including mechanism adapted to be coupled with the jacking means for actuating the same from the motive power of the tractor, said jacking means and actuating mechanism having detachable coupling devices, mounted for interengagement irrespective of the angular relative positions of the tractor and trailer.

3. The combination with a trailer truck having jacking means carried thereby for elevating and supporting the same, of a motor driven tractor for hauling the trailer including mechanism operable by the motive power of the tractor and adapted to be coupled with the jacking means for actuating the same, said mechanism including a coupling element, a shaft connected therewith, clutch elements driven in opposite directions from the tractor motor, complementary clutch elements splined to said shaft for selective engagement with the first-mentioned clutch elements to drive the shaft in opposite directions, means for shifting the clutch elements into and out of engagement, a threaded portion on said shaft, a traveler element engageable by said threaded portion and movable in opposite directions by turning of the shaft in opposite directions, and elements operatively connected with the clutch-shifting means disposed in the path of said traveler for automatically releasing the engaged clutch elements after a predetermined rotation of the shaft and coupling element.

4. The combination with a trailer truck having a pair of laterally spaced jacks permanently carried thereby for elevating and supporting the same, a transverse shaft operatively connecting the jacks for simultaneous movement, and means movable with respect to the shaft for turning the same to operate the jacks, said means including a forwardly projecting shaft having a coupling element flexibly connected with the shaft; of a motor tractor for hauling the trailer, including mechanism operable by the tractor motor and adapted to be coupled with the coupling element of the jacking means for actuating the same to respectively effect the connection and disconnection of the tractor and trailer.

5. The combination with a trailer truck having a pair of laterally spaced jacks permanently carried thereby for elevating and supporting the same, a transverse shaft operatively connecting the jacks for simultaneous movement, and means movable with respect to the shaft for turning the same to operate the jacks, said means including a forwardly projecting shaft having a coupling element flexibly connected with the shaft; of a motor tractor for hauling the trailer, including mechanism operable by the tractor motor and adapted to be coupled with the coupling element of the jacking means for actuating the same to respectively effect the connection and disconnection of the tractor and trailer, said mechanism including a complementary coupling device laterally swingable with respect to the tractor and having a flexible connection with the coupling device.

6. The combination with a trailer truck having a pair of laterally spaced jacks permanently carried thereby for elevating and supporting the same, a transverse shaft operatively connecting the jacks for simultaneous movement, and means movable with respect to the shaft for turning the same to operate the jacks, said means including a forwardly projecting shaft having a coupling element flexibly connected with the shaft; of a motor tractor for hauling the trailer, including mechanism operable by the tractor motor and adapted to be coupled with the coupling element of the jacking means for actuating the same to respectively effect the connection and disconnection of the tractor and trailer, said mechanism including a complementary coupling device laterally swingable with respect to the tractor and having a flexible connection with the coupling device, and means for selectively connecting and disconnecting said mechanism with the motive power of the tractor.

7. A motor tractor and a trailer including complementary coupling elements connectable and disconnectable by relative vertical movements therebetween, jacking means permanently carried by and depending from the forward end of the trailer for elevating the same to disconnect the coupling elements and for supporting the trailer when disconnected, mechanism carried by the tractor adapted to be operatively connected respectively with its motive power and with the jacking means of the trailer for actuating said jacking means to effect the raising of the same to lower the forward end of the trailer whereby to connect the coupling elements and for lowering the jacking means to raise the forward end of the trailer for disconnecting the coupling elements.

8. A motor tractor and a trailer including complementary coupling elements connectable and disconnectable by relative vertical movements therebetween, jacking means permanently carried by and depending from the forward end of the trailer for elevating the same to disconnect the coupling elements and for supporting the trailer when disconnected, mechanism carried by the tractor adapted to be operatively connected respectively with its motive power and with the jacking means of the trailer for actuating said jacking means to effect the raising of the same to lower the forward end of the trailer whereby to connect the coupling elements and for lowering the jacking means to raise the forward end of the trailer for disconnecting the coupling elements, said mechanism including automatic means for disconnecting said mechanism from the motive power of the tractor immediately prior to the jacking means reaching the limit of its movement in either direction.

Signed at New York, in the county of New York and State of New York, this 6th day of December, A. D. 1927.

JOHN A. HIGGINS.